(12) United States Patent
Engbersen et al.

(10) Patent No.: US 6,341,304 B1
(45) Date of Patent: Jan. 22, 2002

(54) DATA ACQUISITION AND DISTRIBUTION PROCESSING SYSTEM

(75) Inventors: Antonius Paulus Engbersen, Feusisberg (CH); Jason Juan Hernandez, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,282

(22) Filed: Sep. 23, 1999

(51) Int. Cl.⁷ .............................................. G06F 11/00
(52) U.S. Cl. ...................................... 709/203; 709/225
(58) Field of Search ........................ 709/203, 223–225, 709/247, 233; 707/10

(56) References Cited

U.S. PATENT DOCUMENTS

| | | | | |
|---|---|---|---|---|
| 5,875,175 A | | 2/1999 | Sherer et al. ............... | 370/230 |
| 5,878,220 A | * | 3/1999 | Olkin et al. ................. | 709/217 |
| 5,913,041 A | * | 6/1999 | Ramanathan et al. ........ | 709/233 |
| 5,956,716 A | * | 9/1999 | Kenner et al. ............... | 707/10 |
| 5,996,022 A | * | 11/1999 | Krueger et al. ............. | 709/247 |
| 6,185,601 B1 | * | 2/2001 | Wolff ........................ | 709/203 |
| 6,185,625 B1 | * | 2/2001 | Tso et al. ................... | 709/247 |

FOREIGN PATENT DOCUMENTS

| | | | | |
|---|---|---|---|---|
| EP | 0 868 063 A2 | | 3/1998 | ........... H04L/29/06 |
| EP | 0868063 | * | 3/1998 | ........... H04L/29/06 |

\* cited by examiner

*Primary Examiner*—David Wiley
(74) *Attorney, Agent, or Firm*—David A. Mims, Jr.; Robert V. Wilder

(57) ABSTRACT

A method and implementing computer system is provided in which network site and/or data requests are kept track of in terms of the number of times the same data or site request is presented. In one example, when the request frequency for any particular data file reaches a predetermined number, or when a frequently requested data file is sufficiently large as to significantly impact the network bandwidth, the data file requested is marked for download during off-peak hours to a local non-volatile storage device such that subsequent user requests for that data item may be serviced directly from a local server or local storage device more proximate to the requesting user, thereby reducing overall bandwidth use for frequently requested data.

19 Claims, 4 Drawing Sheets

DATA ACQUISITION AND DISTRIBUTION PROCESSING SYSTEM

FIELD OF THE INVENTION

The present invention relates generally to information processing systems and more particularly to a methodology and implementation for processing network related transactions including data download requests.

BACKGROUND OF THE INVENTION

Although the present disclosure is discussed in terms of the Internet, it is understood that the invention is applicable to servers in any networked system in which data is requested, and also to individual workstations or personal computers (PCs) which directly access remote sites to download data. In large network systems such as the Internet, network terminal users are able to designate network sites by address, typically through a browser program at the user terminal, and to effect a connection to the site designated. When the connection is made, the user views a screen or homepage which is made available by the administrator or owner of the designated site. The user may then select other sites or addresses directly by keyboard input or by "pointing and clicking" a mouse or other pointing device on various "hypertext" or Icon areas on the screen. In this manner, network users are able to request access to network sites which have data files in which the user is interested at a particular time.

In many systems, a network server is utilized to manage a smaller or local network, and access requests from users of the local network to remote or Internet sites. In any case, when many requests occur at the same time, the available bandwidth at any given time is quickly used up and processing time is significantly reduced as many transactions are requested using the same limited access resources.

Thus, there is a need for an improved methodology and implementing system which enables a more efficient use of available bandwidth for systems in which there is frequent accessing and downloading of often-requested data files and libraries.

SUMMARY OF THE INVENTION

A method and implementing computer system is provided in which network site and/or data requests are kept track of in terms of the number of times the same data or site request is presented. In one example, when the request frequency for any particular data file reaches a predetermined number, or when a frequently requested data file is sufficiently large as to significantly impact the network bandwidth, the data file requested is marked for download during off-peak hours to a local non-volatile storage device such that subsequent user requests for that data item may be serviced directly from a local server or local storage device more proximate to the requesting user, thereby reducing overall bandwidth use for frequently requested data.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
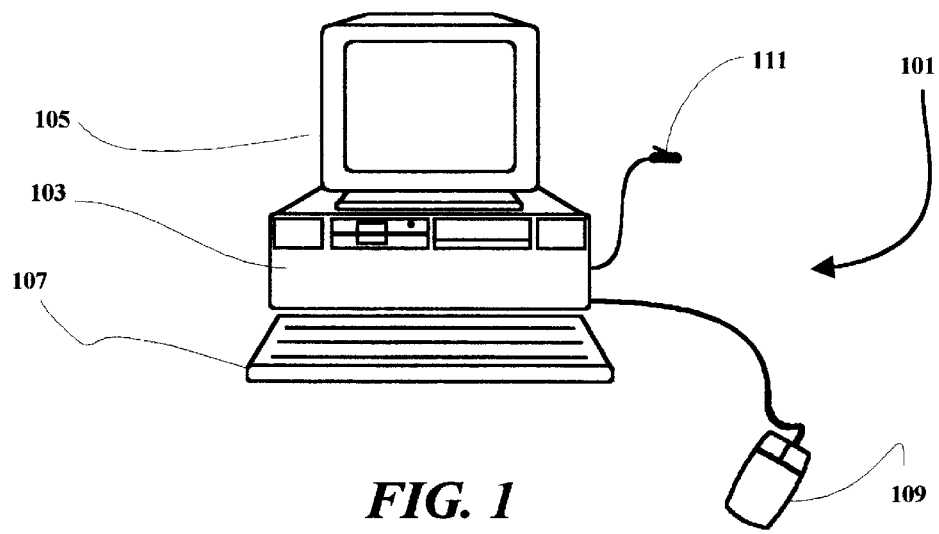
FIG. 1 and 5 are diagrams of a computer system in which the present invention may be implemented.

In providing the disclosed methodology and an exemplary implementation of the present invention, it is noted that for many networked systems, the great majority of data transfer or acquisition requests are for the same, relatively few, data files, which although lengthy, are requested over and over again. In an Internet application, the majority of the viewing and downloading for a given group of users is done relative to a small set of web pages and download files. By tracking these requests and downloading the frequently accessed files during off-peak hours, significant bandwidth use savings can be achieved. Network traffic is profiled and the most frequently accessed information is determined and distributed during off-hours in the available and unallocated bandwidth. In addition to profiled data sets, specific data sets could be added by network administrators, for example, to the off-hours distribution.

The target machines would either be transparent caching servers or users workstations. As part of the distributed data, each target machine would get a list of items that are available via the off-hours distribution process. The person responsible for the target machine could choose, either automatically or manually, to receive none, some or all of the information in the off-hours distribution and save it in a local memory for later use. In the caching server example, this methodology would allow web requests to be satisfied locally. In the example of an individual workstation, some code could be installed locally to store the off-hours distribution data as well as to intercept calls to the web and locally respond to the requests where possible. Making use of off-hours bandwidth to populate many local caches significantly reduces peak utilization and at the same time, utilizes bandwidth that would otherwise not be used.

The various methods discussed herein may be implemented, for example, within a typical computer system and/or network, which may include one or more workstations or personal computers. In general, an implementing computer system may include a plurality of processors in a multi-bus system in a network of similar systems. However, since the workstation or computer system implementing the present invention in an exemplary embodiment, is generally known in the art and composed of electronic components and circuits which are also generally known to those skilled in the art, circuit details beyond those shown in the drawings are not specified to any greater extent than that considered necessary as illustrated, for the understanding and appreciation of the underlying concepts of the present invention and in order not to obfuscate or distract from the teachings of the present invention.

In FIG. 1, a computer system 101 includes an electronics enclosure 103 which is typically arranged for housing one or more CPUs (central processing units) along with other component devices and subsystems of the computer system 101. The computer system 101 also includes a monitor or display unit 105, a keyboard 107 and a mouse or pointing device 109, which are all interconnected within the illustrated computer system. Also shown is a connector 111 which is arranged for connecting a modem within the computer system to a communication line such as a telephone line in the present example. The present invention may also be implemented in a cellular system without the connector 111.

Figure 2:
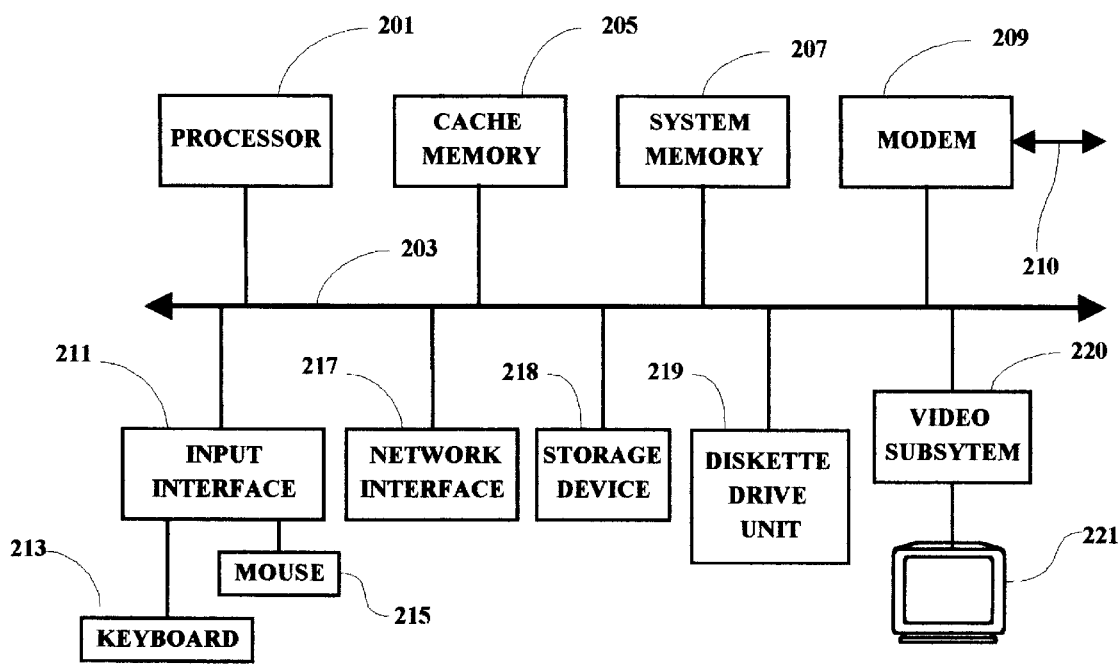
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217 and a diskette drive unit 219. A video subsystem 220, which may include a graphics subsystem, is connected to a display device 221. A storage device 218, which may comprise a hard drive unit or CD ROM, is also coupled to the bus 203. The diskette drive unit 219 provides a means by which individual diskette programs may be loaded on to the hard drive, or accessed directly, for selective execution by the computer system 101. As is well known, program diskettes containing application programs represented by magnetic indicia on the diskette, or programs in system memory, or acquired through a local network or through the world wide web may be read to provide program signals. Such program signals are selectively effective to cause the computer system to present displays on the screen of a display device and respond to user inputs in accordance with the functional flow of the application program being executed. Using a computer system such as that illustrated in the exemplary embodiments shown in FIG. 1 and FIG. 2, remote network sites containing often-requested data files may be accessed, either through the network interface 217 or the modem connection 209.

In running an Internet access program or browser program on the computer system 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. Assuming a user has started-up the system, and is actively running a browser program for example, from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet operating program, the selections made by the user will determine "where" the user "goes", i.e. to what "site" or "webpage", and also, in some cases, the communications link or the path taken to get to the site selected. This information is contained in the "URL" (Uniform Resource Locator) field on the display screen, which may also contain the identity of particular files which are requested by a user of the system.

Figure 3:
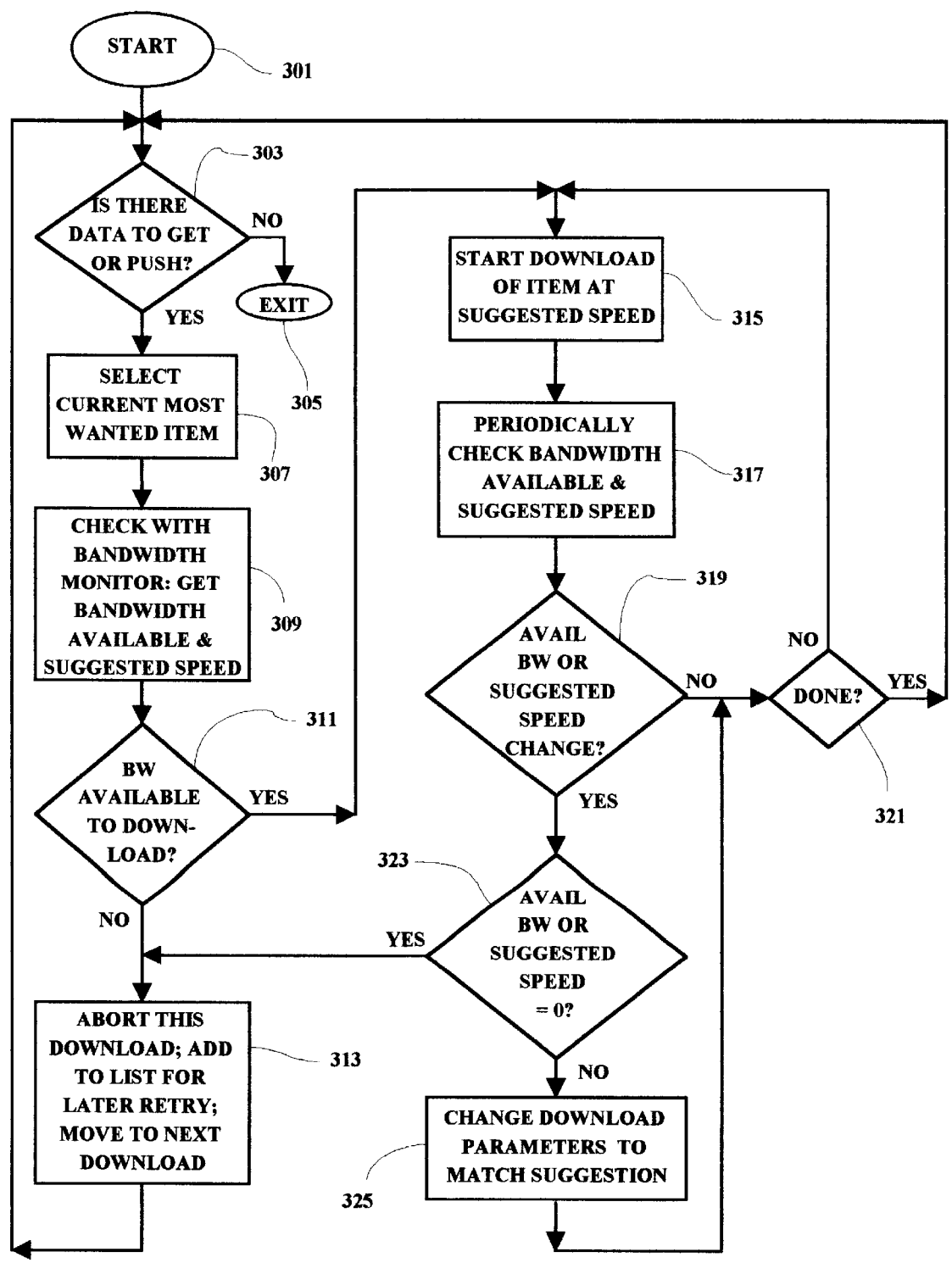
FIG. 3 is a flowchart illustrated an exemplary flow in one implementation of the present invention.

FIG. 3 illustrates an exemplary program flow which may be implemented to practice the present invention. After the system is started 301 a check is made to determine if there is a request 303 to get or "push" data to a data source site. If there is no request 303 the process exits the program 305. If there is a request for data 303, a search is made to select the current most wanted item 307. Next, a bandwidth monitor (which is explained in more detail in FIG. 4) is checked 309 to get bandwidth available and suggested speed. A check is then made 311 to determine if there is sufficient bandwidth available to download the requested data. Different applications may have differing definitions with regard to what constitutes sufficient bandwidth. If at a given time, it is determined that the network is so busy transferring information that new requests will be processed at an unacceptable speed and take too much time to be delivered, then rather than wait for an unacceptable period of time for the data access transaction to be processed, a requesting server is able to store the request and execute that request at a later, less busy time, when the network available bandwidth is greater and the processing time is less. If the available bandwidth is below a predetermined threshold level, the available bandwidth may be deemed to be insufficient depending upon the processing efficiency required by the network operator. If sufficient bandwidth is not available 311, the current download is aborted, the request is added to a list for later retry and the process is continued by moving to the next download request 313 (which may use an access path or link having more available bandwidth at the time). This process may be further specified by factoring-in time limits for the download taking into account the available bandwidth and the size and importance of the requested download vis-a-vis other requested downloads.

If it is determined during the first pass that there is bandwidth available to download requested data 311, the download of the item at the suggested speed is initiated 315. A repetitive process may also be started at this point to periodically check for changes in available bandwidth and transfer speed 317. If there is no change in the available bandwidth or speed during the download process 319, when the download is completed 321, the process returns to check for the next data request or push 303. If the download does not complete or does not complete in a designated period of time 321, then the download may be re-started 315 as shown. Alternatively, an error message may be recorded and the process may either return for the next request or push, or the process may terminate. If there is a change in the available bandwidth or speed 319, and the change results in a "0" bandwidth or speed 323, then the download is aborted, the request is added to the list for later retry and the process returns to check for the next download 303. If the change in detected bandwidth condition does not result in a "0" condition, the download parameters may be adjusted 325 to accommodate the bandwidth change, and when the download is completed 321, the process returns to check for the next download request 303.

Figure 4:
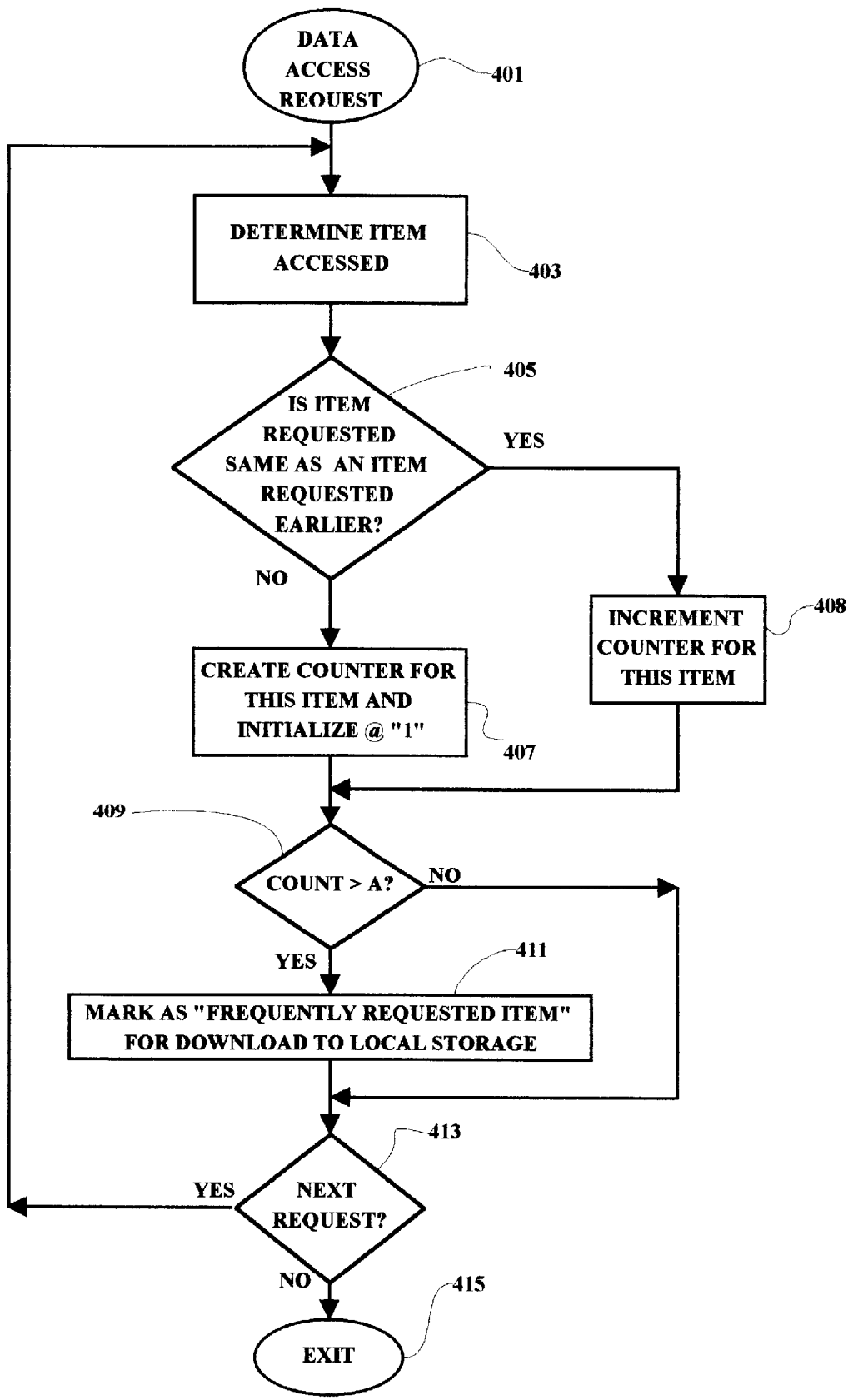
FIG. 4 is a flow chart illustrating a record-keeping aspect of the methodology of the present invention.

In FIG. 4, an exemplary request monitoring process is illustrated. For each data access request 401, the item requested is identified 403 and a check is made to determine if the item is the same as an earlier request 405. If not, an item counter is created for this item and the new counter is initialized 407 at a count of "1". If the data item requested is the same as an earlier request, the counter for that item is incremented 408. Next, a check is made 409 to determine if the count for the particular item being processed is greater than a predetermined number "A". The value set for "A" will depend upon the particular application and will vary depending upon the user's determination of how many times a data file is accessed before it is preferable to be able to more quickly access the file from a closer cache. When the count of the number of times a particular data file has been requested exceeds a predetermined value "A" 409, the file is marked as a "Frequently Requested Item" 411 which will be downloaded to local non-volatile storage. The count of the access request does not exceed the value "A" 409, the item is not marked. In either case, the process then checks for the next request 413. When there are no more data requests to be processed 413, the method is exited 415. Otherwise, if there is another request 413, the process, beginning at step 403, is repeated for the next request. In the exemplary implementation, the network over which the data is to be transferred includes means for detecting available bandwidth parameters including idle bandwidth between two points of transmission. Also, as discussed in connection with FIG. 4, the network is able to dynamically throttle down transfers to be less than or equal to available bandwidth (or throttle up to take full advantage of available bandwidth).

In an exemplary embodiment, as noted above, when the number of times that a data file is requested exceeds a predetermined number "A", that data file is considered a "frequently requested data file" and may be designated as such by a user system or a network administrator for example. Files classified as "frequently requested data files" may, for example, be downloaded in response to a request, into a non-volatile local storage device and saved after user sign-off instead of being downloaded only to local volatile memory where the data file is typically deleted when a user terminates a session. Once a download of a "frequently requested data file" has been accomplished, the data file which has been downloaded from a remote database site to the local request site may be automatically loaded into a local storage device which has a relatively short data path to requesting stations in a user system. Thus, the frequently requested data file is thereafter available locally from local storage such that subsequent requests for the same data file can be "intercepted" and fulfilled by accessing local storage, which now contains a copy of the downloaded data file, instead of routing repeated requests for the same data file over the same relatively long data path over a network or Internet path to a remote database site. This feature significantly reduces bandwidth usage for repeated accesses and transfers between local terminals or network servers and remote database sites. Requested accesses to the data files downloaded and stored locally can continue to be monitored, and when demand for the data file is terminated or there are no requested accesses for a certain period of time, then a reminder message may be presented to a terminal user or network administrator to determine whether the file should be deleted from local storage. This may occur for example if the data file is dated and/or becomes obsolete.

Figure 5:
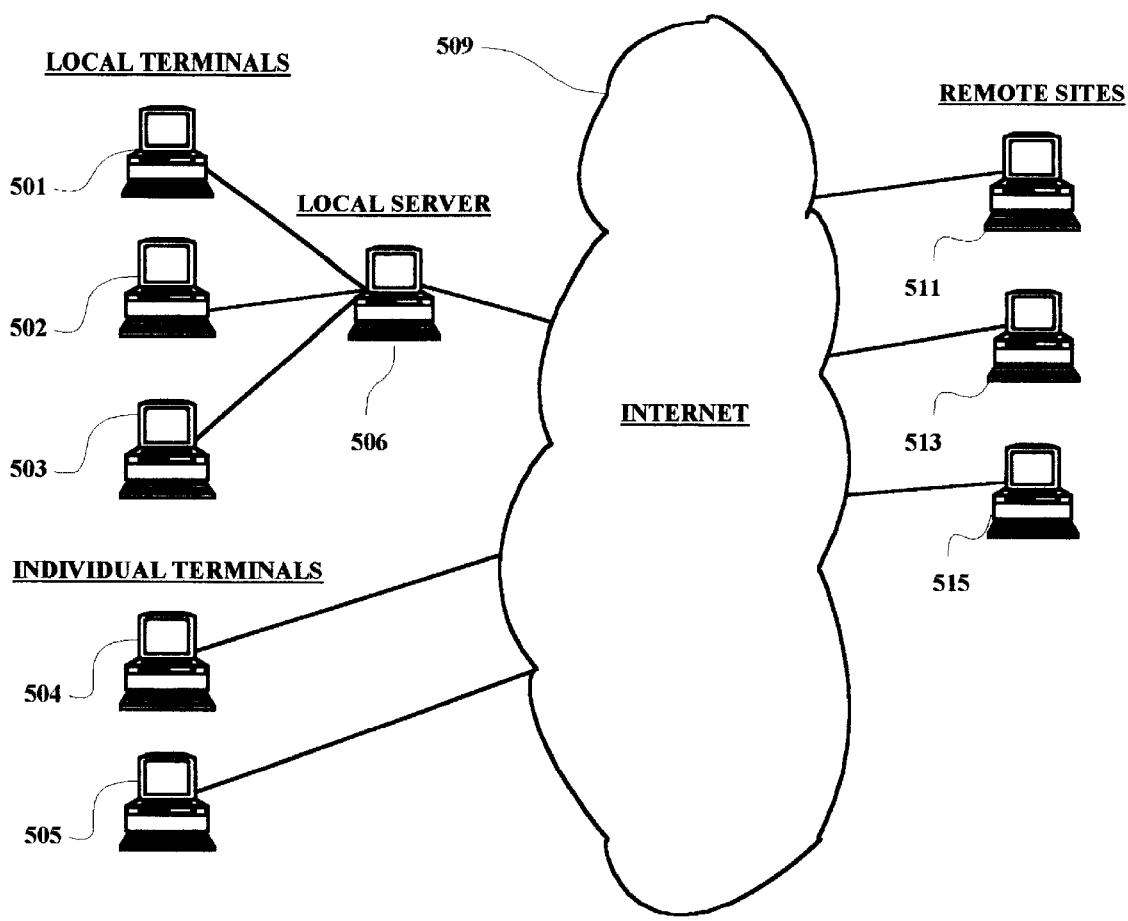

Several exemplary network arrangements in which the present invention may be implemented are illustrated in FIG. 5. As shown, one arrangement includes a plurality of local terminals 501, 502 and 503 which are connected through a local server 506 to the Internet or world wide web network, which in turn, is connected to a plurality of remote sites 511, 513 and 515. Direct individual connections to the Internet are also available as shown by the individual terminals 504 and 505. The connections shown in the illustration may be wireless or hardwired or a combination of the two. The data path between the local terminals 501–503 or individual terminals 504–505, and the remote terminals 511–515 is typically quite long and a relatively substantial amount of time is required to transmit data requests to the remote sites and to download the requested data items back to the requesting terminals. Thus, with the present invention, when a data item is frequently requested, it is downloaded to a local storage device and accessed from local storage thereafter. This process can also be made invisible to the user such that even though a user may request a data item and designate the remote address, the address will be intercepted locally before the request is transmitted and the request is fulfilled from local storage.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing local requests for a data item stored at a remote site, said method comprising:

receiving a request from one or more local terminals to access said data item at said remote site;

determining an available bandwidth upon receiving said request, downloading said data item to said local non-volatile storage device when said data item is requested by more than a predetermined number of said local terminals, said downloading being postponed if said available bandwidth is below a predetermined threshold value; and accessing said data item from said local non-volatile storage device in response to subsequent requests from said local terminals to access said data item.

2. The method as set forth in claim 1 wherein said requests are postponed until available bandwidth is above said threshold level.

3. The method as set forth in claim 1 wherein said requests are postponed until a predetermined time when request traffic to said remote site is expected to be at a lower level.

4. The method as set forth in claim 2 and further including:

periodically checking said available bandwidth; and re-trying said requests when available bandwidth is above said threshold level.

5. The method as set forth in claim 4 and further including:

assigning a priority to said requests, said priority being based on a number of times each request is made in a given period of time.

6. The method as set forth in claim 1 wherein said requests are generated by individual user terminals, said user terminals being coupled directly to an Internet network service provider, said local non-volatile storage device comprising a storage device within said user terminal.

7. The method as set forth in claim 1 wherein said requests are generated by individual user terminals, said user terminals being coupled to a common local server, said local non-volatile storage device comprising a storage device within said common local server.

8. The method as set forth in claim 1 wherein said downloading further includes:
periodically checking available bandwidth during said downloading; and
adjusting parameters of said downloading to match available bandwidth if said available bandwidth changes during said downloading.

9. The method as set forth in claim 1 wherein said downloading further includes:
periodically checking available bandwidth during said downloading; and
terminating said downloading if said available bandwidth changes to a value below a predetermined minimum value during said downloading.

10. A storage medium including machine readable coded indicia, said storage medium being selectively coupled to a reading device, said reading device being selectively coupled to processing circuitry within a computer system, said reading device being selectively operable to read said machine readable coded indicia and provide program signals effective for processing local requests for a data item stored at a remote site, said program signals being selectively operable to accomplish the steps of:
receiving a request from one or more local terminals to access said data item at said remote site;
determining an available bandwidth upon receiving said request,
downloading said data item to said local non-volatile storage device when said data item is requested by more than a predetermined number of said local terminals, said downloading being postponed if said available bandwidth is below a predetermined threshold value; and
accessing said data file from said local non-volatile storage device in response to subsequent requests from said local terminals to access said data item.

11. The medium as set forth in claim 10 wherein said requests are postponed until said available bandwidth is above said threshold level.

12. The medium as set forth in claim 10 wherein said requests are postponed until a predetermined time when request traffic to said remote site is expected to be at a lower level.

13. The medium as set forth in claim 11 and further including:
periodically checking said available bandwidth; and
re-trying said requests when available bandwidth is above said threshold level.

14. The medium as set forth in claim 13 and further including:
assigning a priority to said requests, said priority being based on a number of times each request is made in a given period of time.

15. The medium as set forth in claim 10 wherein said requests are generated by individual user terminals, said user terminals being coupled directly to an Internet network service provider, said local non-volatile storage device comprising a storage device within said user terminal.

16. The medium as set forth in claim 10 wherein said requests are generated by individual user terminals, said user terminals being coupled to a common local server, said local non-volatile storage device comprising a storage device within said common local server.

17. The medium as set forth in claim 10 wherein said downloading further includes:
periodically checking available bandwidth during said downloading; and
adjusting parameters of said downloading to match available bandwidth if said available bandwidth changes during said downloading.

18. The medium as set forth in claim 10 wherein said downloading further includes:
periodically checking available bandwidth during said downloading; and
terminating said downloading if said available bandwidth changes to a value below a predetermined minimum value during said downloading.

19. An information processing system for processing local requests for data items stored at remote sites, said system comprising:
a system bus;
a processor coupled to said system bus; and
a local non-volatile storage device coupled to said system bus, said processor being selectively operable for processing said local requests by determining an available bandwidth upon receiving one of said requests and downloading said data item to said local non-volatile storage device when said data item is requested by more than a predetermined number of said local terminals, said downloading being postponed if said available bandwidth is below a predetermined threshold value, and accessing said data item from said local non-volatile storage device in response to subsequent local requests to access said data item.

* * * * *